United States Patent [19]

Brennen

[11] Patent Number: 5,349,517
[45] Date of Patent: Sep. 20, 1994

[54] ACTIVE POWER LINE CONDITIONER UTILIZING HARMONIC FREQUENCY INJECTION FOR IMPROVED PEAK VOLTAGE REGULATION

[75] Inventor: Michael B. Brennen, Pittsburgh, Pa.

[73] Assignee: Westinghouse Electric Corporation, Pittsburgh, Pa.

[21] Appl. No.: 108,269

[22] Filed: Aug. 19, 1993

[51] Int. Cl.$^5$ .................... H02M 1/12; H02M 1/14
[52] U.S. Cl. ...................... 363/40; 363/46; 363/98; 363/71; 323/207
[58] Field of Search ............ 363/39, 40, 45, 46, 363/97, 98, 71; 323/207

[56] References Cited

U.S. PATENT DOCUMENTS

| | | | |
|---|---|---|---|
| 3,825,815 | 7/1974 | Gyugyi et al. | 321/9 A |
| 4,651,265 | 3/1987 | Stacey et al. | 363/35 |
| 5,218,520 | 6/1993 | Rozman et al. | 363/39 |

*Primary Examiner*—Emanuel T. Voeltz

[57] ABSTRACT

The present invention provides an active power line conditioner (APLC) which has improved peak voltage regulation capability when compared with similarly-sized devices constructed according to current teachings. The invention utilizes a control function which, when the AC input voltage is not within a given sinusoidal regulation range of the APLC, superimposes selected harmonics of the fundamental frequency on the reference voltage signal used to control voltage regulation action. This causes the AC output voltage of the APLC to have a nonsinusoidal, but peaking waveform shape. The magnitude of the harmonics are preferably controlled to increase as the amount by which the AC input voltage falls outside the linear regulation range of the active power-line conditioner. In presently preferred embodiments, the chosen harmonic frequency is preferably an odd harmonic of the fundamental frequency, with third or fifth harmonics believed to be particularly useful. To Lessen the potential for unwanted zero crossings of the AC output voltage, means may be provided to modulate the harmonic reference with an envelope frequency equal to twice the fundamental frequency.

16 Claims, 5 Drawing Sheets

ACTIVE POWER LINE CONDITIONER UTILIZING HARMONIC FREQUENCY INJECTION FOR IMPROVED PEAK VOLTAGE REGULATION

BACKGROUND OF THE INVENTION

1. Field of the Invention

The present invention relates to active power line conditioners which are utilized to regulate the quality of electrical energy delivered from an electrical energy source to an electrical load. More particularly, the invention relates to an improvement in an active power line conditioner (APLC) which significantly increases peak voltage regulation capability.

2. Description of the Prior Art Electric supply networks are increasingly being exposed to the consequences of nonlinear loads, such as data processing equipment, numerical controlled machines, variable speed motor drives, robotics, medical apparatus and communication equipment. Such loads draw nonlinear pulse-like currents instead of the sinusoidal currents drawn by linear loads (i.e., resistors, inductors and capacitors). These nonlinear currents flow through the source impedance of the electrical energy source, causing distortion of the AC line voltage.

This voltage distortion may produce a number of undesired effects. For example, sensitive loads connected to the network may experience operational difficulties. Additionally, the RMS current supplied by the energy source will generally increase due to the presence of harmonics in the pulse-like currents. These harmonic currents may cause significant resistive ($I^2R$) losses in interposing transformers.

Another problem is the occurrence of temporary sags in the AC supply voltage. This may affect, in particular, electrical equipment which utilizes a power supply input stage incorporating a rectifier bridge connected across one or more large filter capacitors. In normal operation, the filter capacitors recharge with each peak of the rectified line voltage. It is only during this peak that the load is actually drawing current from the electrical supply network. When the rectified line voltage is lower than the voltage level on the filter capacitors, the rectifier diodes will prevent current from flowing. If, however, the line voltage does not maintain an adequate peak-no-peak level, these filter capacitors will not be able to maintain their required peak charge levels.

Many of these problems can be mitigated through the use of power electronic devices known as active power line conditioners. Such devices typically comprise one or two switching inverters arranged in a series, parallel, or series-parallel configuration. The inverters are controlled (generally by pulse width modulation (PWM) techniques) to effect a flow of current between a DC energy storage element and the AC supply lines to which they are connected. Such devices are shown and described in U.S. Pat. Nos. 4,651,265 and 3,825,815, which are incorporated herein my reference.

When a single inverter is used, this current may consist of the harmonic and ripple currents required by the load. In a series-parallel configuration, two inverters are arranged to share a common DC link. In this arrangement, the inverters may cooperate to effect a transfer of real power between the source or load and the DC link. This may help to ensure that power delivered to the various loads will be nearly ideal.

The voltage regulation capability of an active power line conditioner is given in terms of a percentage of the nominal AC line voltage. While the line voltage magnitude stays within this rated percentage range, the output voltage stays essentially constant and sinusoidal at the nominal value. Generally, this range is selected to fall between ±10% to ±25% of the nominal output voltage.

When the supply voltage sinks below the rated boost range of the active power line conditioner, the output voltage tends to also be dragged down. Thus, the line voltage seen by various loads connected to the network will fall below the nominal value and the quality of power delivered to these loads is no longer ensured. This is particularly true in the case of loads having rectified capacitive inputs, since the filter capacitors may not be able to obtain their peak charge level as discussed above. Additionally, transient voltage sags or surges may exceed the selected rating of the series voltage regulator on a statistical basis.

In order, therefore, to provide the greatest assurance of power quality to loads supported by an active power line conditioner, it is desirable for the device to have as large a regulation range as is practical. The weight and cost, however, associated with the magnitude of voltage regulation capability is proportional to the regulation range. As such, an active power line conditioner with a higher regulation range would be expected to be larger and more expensive than a similar device with a smaller regulation range. This may tend to negatively affect the commercial viability of such equipment. The installation of larger components to support excessive input voltage sags may also have greater losses that would reduce overall efficiency.

SUMMARY OF THE INVENTION

The present invention provides an active power line conditioner which has improved peak voltage regulation capability when compared with similarly-sized devices constructed according to current teachings. When the AC input voltage deviates from its nominal value by an amount exceeding a preselected threshold, selected harmonics of the fundamental frequency are superimposed on the reference voltage signal used to control voltage regulation action. This produces an AC output voltage which has a peaking, quasi-sinusoidal waveform shape. The transient peak provided in this manner will help to maintain filter capacitors in rectified capacitive power supplies at required peak charge levels for a greater degree of deviation in the line voltage. Larger transient sags or spikes in the line voltage can also be compensated.

In presently preferred embodiments, the device functions similarly to an active power line conditioner constructed according to current teachings when deviations of the line voltage fall within the sinusoidal regulation range. As the line voltage exceeds this range, the magnitude of the injected harmonics is preferably controlled to proportionally increase. The injected harmonics are preferably odd harmonics of the fundamental frequency, with third or fifth harmonics believed to be particularly useful. To lessen the potential for unwanted zero crossings of the AC output voltage, means may be provided to modulate the harmonic reference with an envelope frequency equal to twice the fundamental frequency.

DETAILED DESCRIPTION OF PRESENTLY PREFERRED EMBODIMENTS

Figure 1A:
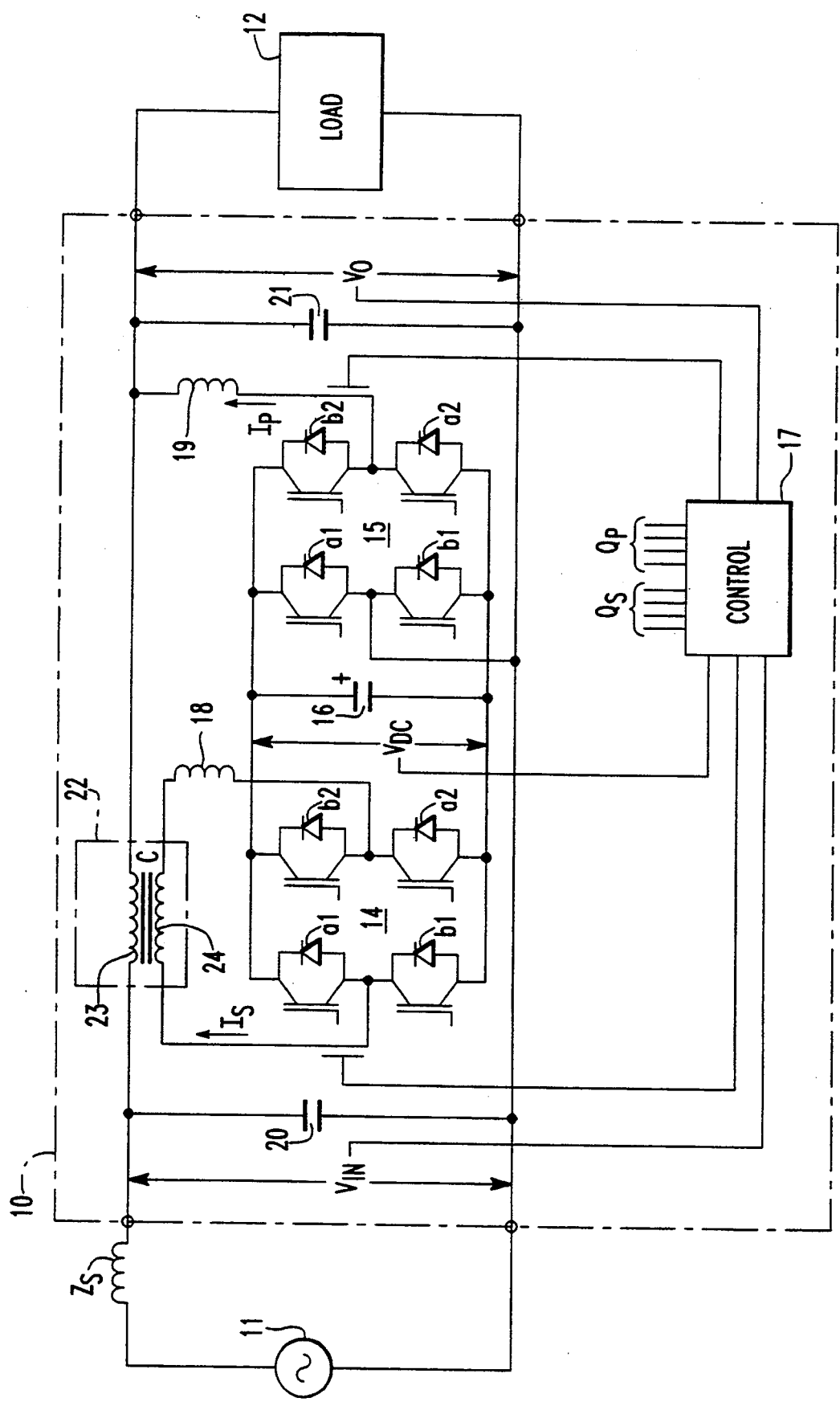
FIG. 1A is a schematic representation of an improved series-parallel APLC constructed in accordance with the present invention.

FIG. 1A illustrates an active power line conditioner (APLC) 10 constructed in accordance with the invention. As shown, APLC 10 i connected interposing an electrical energy source 11 supplying an electrical load 12. Electrical energy source 11 includes source impedance $Z_s$, which is primarily inductive in nature. APLC 10 is a series-parallel device having a series inverter 14 and a parallel inverter 15 interconnected by a shared DC link. A storage capacitor 16 is connected across the DC terminals of inverters 14 and 15 and functions as a DC energy storage element. Instead of capacitor 16, an inductor may also be used for this purpose. When the AC line voltage is within the sinusoidal regulation range of APLC 10, it is desirable to maintain the voltage across capacitor 16 at a nominal value.

Inverters 14 and 15 each include two pairs of switching devices a1,a2 and b1,b2 which are operated in a complementary manner by control 17. Control 17 receives inputs from appropriate sensors within APLC 10 which may provide information regarding the following: AC input voltage $V_{in}$, AC output voltage $V_o$, DC link voltage $V_{DC}$, AC series inverter current $I_s$ and AC parallel inverter current $I_p$. Based on this information, control 17 develops appropriate gating signals (respectively denominated as $Q_s$ and $Q_p$) to deliver regulated power to load 12. Preferably, control 17 operates switches a1,a2 and b1,b2 according to PWM techniques.

Series inverter 14 (which here includes an inductor 18) is coupled in series with electrical energy source 11 to apply an AC regulation voltage to AC input voltage $V_{in}$ in the proper phase and magnitude such that AC output voltage $V_o$ is regulated. Parallel inverter 15 (which here includes an inductor 19) is generally connected across load 12 to source or sink line current as necessary to provide ripple filtering and power factor correction. In order that parallel inverter 15 will be able to easily source or sink line current as desired, the DC voltage $V_{DC}$ across capacitor 16 should be maintained at a level slightly higher than the nominal value of the AC output voltage $V_o$. Because DC voltage $V_{DC}$ may otherwise tend to be depleted due to switching and conduction losses within APLC 10, parallel inverter 15 is also controlled to draw an appropriate amount of real power from the AC supply line. Preferably, the link control has a relatively slow response to avoid interaction between series inverter 14 and parallel inverter 15. Capacitors 20 and 21 are provided to filter switching harmonics generated by the switching action of inverters 14 and 15, respectively.

Series inverter 14 provides the AC regulation voltage for buck/boost regulation of the AC line voltage via coupling transformer 22. Transformer 22 includes a first, or primary, winding 23 which is serially connected in the AC supply line between source 11 and load 12. A second, or secondary, winding 24 of transformer 22 is connected across AC terminals of series inverter 14. Transformer 21 has a magnetically permeable core C.

Figure 1B:
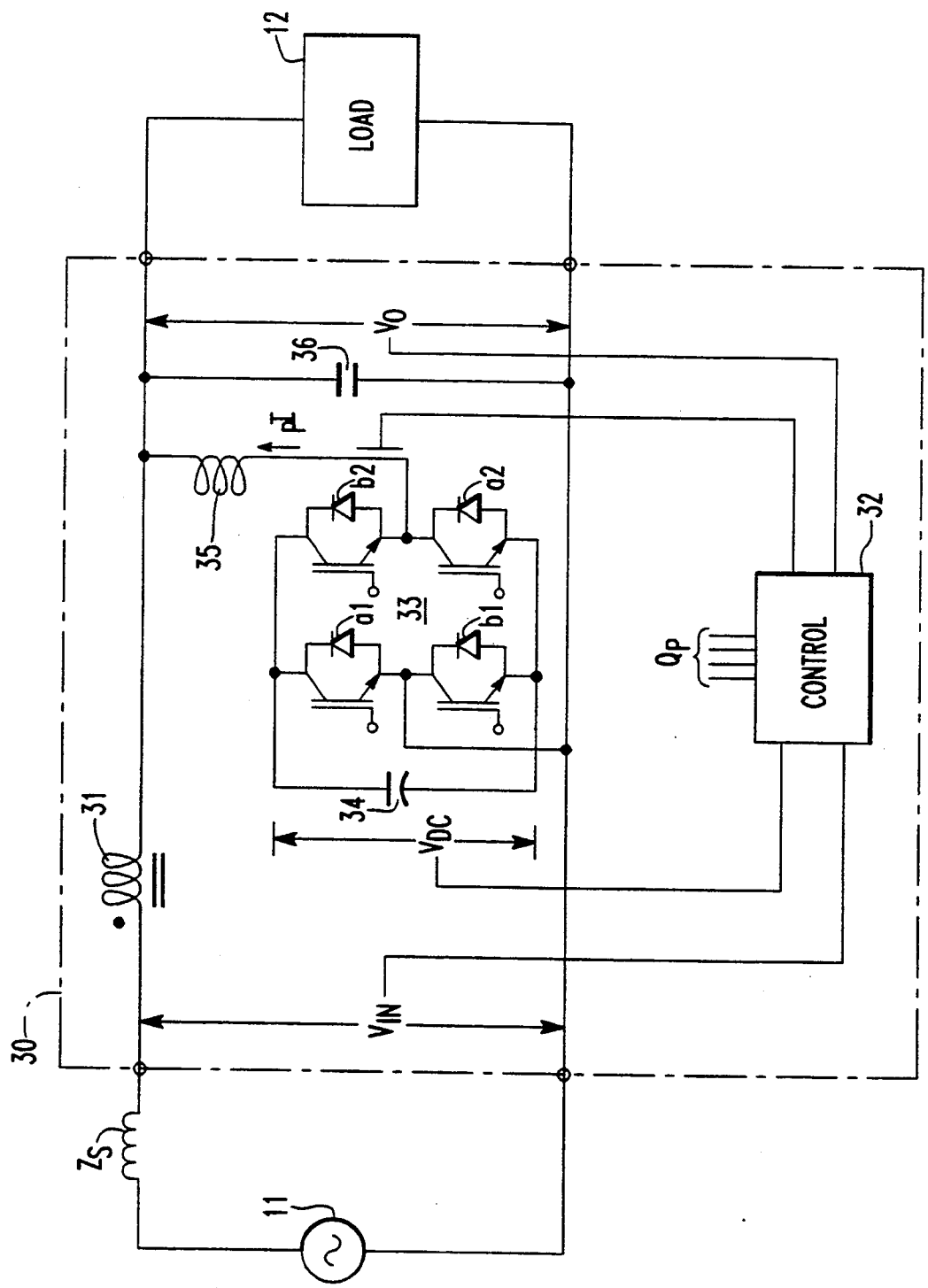
FIG. 1B is a schematic representation of an improved inductor-parallel APLC constructed in accordance with the present invention.

FIG. 1B illustrates a recently-proposed APLC 30 which is also amenable to operation according to the teachings of the present invention. APLC 30, which is fully described in U.S. patent application Ser. No. 08/030,783, filed Mar. 12, 1993 and incorporated herein by reference, utilizes a series-connected inductor 31 in lieu of the series inverter and coupling transformer present in series-parallel APLC 10. Control 32 detects the AC input voltage supplied by source 11 and produces an optimal voltage phase shift parameter, $\Phi^*$, and an inverter capacitance signal. The derived optimal phase shift parameter, $\Phi^*$, is indicative of the instantaneous voltage phase shift across inductor 31. Utilizing this information, the inverter capacitance signal may be derived to control parallel inverter 33 (which includes storage capacitor 34 and inductor 35) to act as a variable capacitor or inductor across electrical load 12. As such, a degree of resonance is achieved which can, within the rated sinusoidal regulation range, generally maintain the voltage across load 12 at the nominal value. Filter capacitor 36 is provided to filter high frequency harmonics produced by the switching action of parallel inverter 33.

In accordance with current teachings (i.e., teachings before the present invention), it has been considered necessary to control the active power line conditioner such that the output voltage always remained sinusoidal. When the AC input voltage $V_{in}$ sagged beyond the rated sinusoidal regulation range of the device, however, the sinusoidal output voltage $V_o$ would also sag below desired peak levels. For example, consider a device of the current design rated to provide sinusoidal regulation range of $\pm 10\%$ for a nominal input voltage of 120 volts. In this case, the active power line conditioner would generally provide a maximum sinusoidal voltage boost of 12 volts. Thus, for values of $V_{in}$ as low as 108 volts, the value of the AC output voltage $V_o$ will remain at 120 volts. If, however, the value of voltage $V_{in}$ falls below the $\pm 10\%$ sinusoidal regulation range, the voltage $V_o$ will also sag with a value equal to the sagging $V_{in}$ plus the maximum voltage boost which may be provided. In the above example, for instance, if the AC input voltage drops to a peak level of 92 volts, $V_o$ will be equal to this 92 volts plus the 12 volt boost, for a total of 104 volts.

The present invention, however, utilizes harmonic "injection" circuitry to provide higher peak voltage levels when the AC input voltage $V_{in}$ falls outside the sinusoidal regulation range of the active Dower line conditioner. Specifically, harmonics of the fundamental frequency are superimposed on the fundamental frequency component of the reference waveform utilized to control the voltage regulation action of the active power line conditioner. Although the waveform shape of the output voltage is not strictly sinusoidal, presently preferred embodiments produce an output voltage which retains a desirable symmetrical characteristic. Thus, the present invention replaces the sinusoidal output voltage with a quasi-sinusoidal wave form having peak values nearer to the peak of the nominal AC input voltage. As a result, the peak levels required by many of the loads to which the device is attached may be maintained. Furthermore, transient spikes appearing in the AC input voltage may be rejected to a greater degree than would otherwise be the case.

Figure 2:
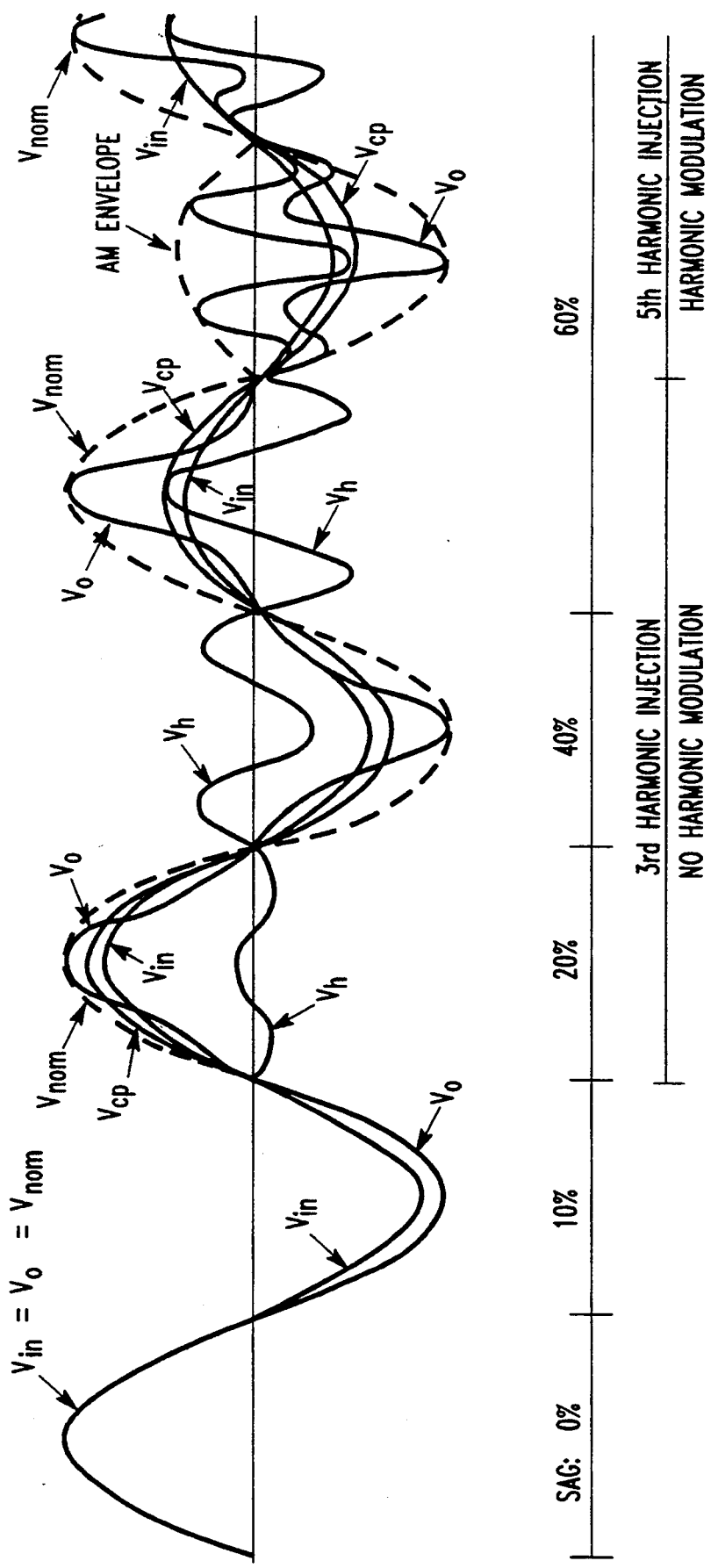
FIG. 2 is a plot of improved voltage regulation capability attainable with the invention in comparison with current teachings for various degrees of input voltage sag.

FIG. 2 graphically illustrates a hypothetical AC input voltage $V_{in}$ being regulated according to current practice and the teachings of the present invention. During the first half cycle, $V_{in}$ is equal to the nominal line voltage $V_{nom}$ at a value of one per unit (PU). Because $V_{in}$ is at the desired level, AC output voltage $V_o$ will also have this value without the aid of regulation action by APLC 10. During the second half cycle, however, it can be that $V_{in}$ has sagged to a level 10% below $V_{nom}$. Assuming that the active power line conditioner has a sinusoidal regulation range of 10%, it will be just capable of maintaining $V_o$ at the 1.0 PU value of $V_{nom}$.

If, however, according to teachings prior to the invention, the value of $V_{in}$ falls below the given sinusoidal regulation range, $V_o$ will also sag with a value equal to the sagging $V_{in}$ plus the maximum amount of sinusoidal regulation voltage which the active power line conditioner can provide. The consequences of $V_{in}$ falling below the sinusoidal regulation range are illustrated in subsequent half cycles of the waveform shown in FIG. 2. There, voltage $V_{in}$ is shown having a degree of sag increasing first to 20%, then 40%, and eventually 60% of $V_{nom}$. According to current teachings, the output voltage $V_{cp}$ ("current practice voltage") would track $V_{in}$ at a level 10% higher.

As discussed above, the present invention achieves higher peak voltages utilizing a harmonic voltage $V_h$ which is superimposed on the fundamental of the boosting voltage. The magnitude of voltage $V_h$ is preferably controlled such that the peak provided is as close to the peak value of $V_{nom}$ as is possible. To give a symmetrical output, the harmonic voltage $V_h$ is preferably an odd harmonic of the fundamental. The frequency should be chosen such that the peak is maintained for a sufficient duration to allow desired charging of capacitors in rectified capacitive power supplies. Third and fifth harmonics are believed to be particularly useful in this application. It is believed that the short duration and relatively low frequency of harmonic voltages $V_h$ pose negligible electrical noise or harmonic heating of components in the connected loads.

As an example of the teachings of the invention, consider the half cycle of FIG. 2 in which $V_{in}$ sags by 20%. In this case, a third harmonic voltage $V_h$ having a 10% (0.1 PU) amplitude is superimposed on the fundamental component of the AC regulation voltage used to boost $V_{in}$. This produces a symmetrical $V_o$ peaking at the peak value of $V_{nom}$. During the next two half cycles, in which $V_{in}$ sags by 40% and 60%, respectively, voltage $V_h$ has corresponding amplitudes of 20% (0.2 PU) and 40% (0.4). As a result, voltage $V_o$ maintains a peak value equal to the peak value of nominal peak of $V_{nom}$. In the last full voltage cycle illustrated in FIG. 2, in which the input voltage $V_{in}$ is shown sagging by 60% of $V_{nom}$, voltage $V_h$ is chosen to be a fifth harmonic of the fundamental.

The last voltage cycle also illustrates an additional manipulation of voltage $V_h$ which may be desirable in some applications. Specifically, voltage $V_h$ is amplitude modulated in this case at an envelope frequency of twice the fundamental frequency. This technique may eliminate undesired zero crossings of $V_o$, thus preventing malfunctions of counters or clocks embedded in the loads which may rely on the AC line voltage for synchronization.

Figure 3:
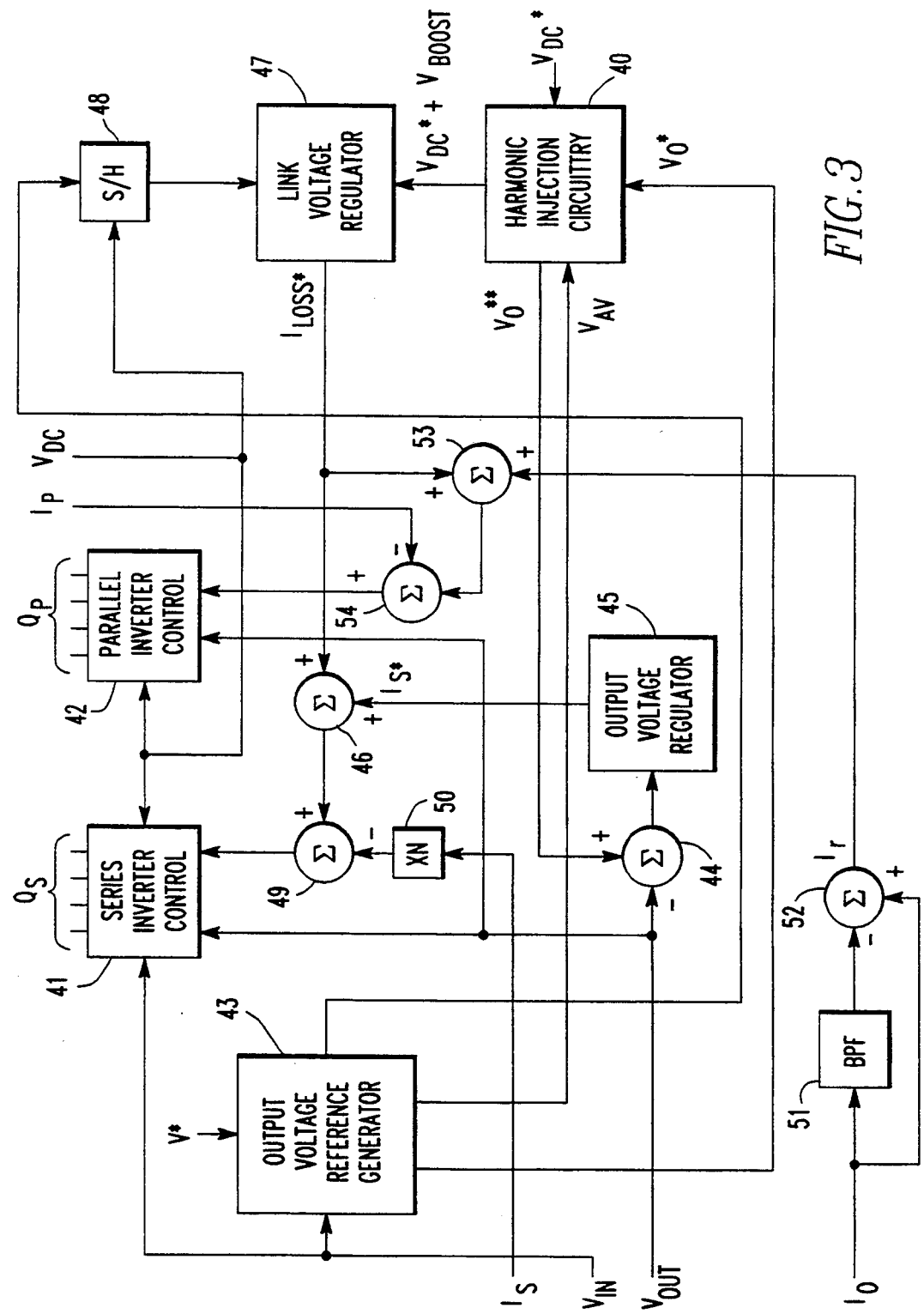
FIG. 3 is a diagrammatic representation of a presently preferred control scheme for use with the active power line conditioner of FIG. 1A.

FIG. 3 illustrates a diagrammatic representation circuitry within control 17 to effect operation of APLC 10 according to the present invention. The circuitry is generally similar to that which has been provided in the past except for the addition of harmonic injection circuitry 40. The harmonic injection circuitry which would be provided within control 32 is generally similar to harmonic injection circuitry 40 except as will be noted below.

Pulse width modulated controllers 41 and 42 provide getting signals $Q_s$ and $Q_p$ to switch inverters 14 and 15, respectively. In order to determine the amount of regulation of voltage $V_{in}$ which is necessary, controller 41 receives input signals representative of both $V_{in}$ and $V_o$. Additionally, an output voltage reference generator 43 receives inputs representative of $V_{in}$ and a reference voltage $V^*$ and produces an output voltage reference signal $V_o^*$. Phase locked loops or unity output voltage band pass filers may be utilized by output voltage reference generator 43 to produce output voltage reference signal $V_o^*$. Reference signal $V_o^*$ is a sinusoidal signal having an amplitude of 1.0 PU which is normally in phase with voltage $V_{in}$. Output voltage reference generator 43 also produces a signal $V_{AV}$ representative of the average value of voltage $V_{in}$.

Signal $V_o^*$ is fed to harmonic injection circuitry 40 which produces voltage reference signal $V_o^{}$. If the value of input voltage $V_{in}$ is within the sinusoidal regulation range of APLC 10, signal $V_o^{}$ will be the same as signal $V_o^*$. Otherwise signal $V_o^{}$ will represent a reference waveform having a fundamental at the line frequency superimposed with the desired harmonics. Signal $V_o^{}$ is then subtracted from the measured value of $V_o$ at summing junction 44. The difference signal thus produced is fed to output voltage regulator 45. Output voltage regulator 45, which may be a proportional-integral (PI) regulator, produces a series inverter current reference signal $I_s^*$.

Series current reference signal $I_s^*$ is added at summing junction 46 to a signal $I_{loss}^*$ representing energy which must be added to the DC link to account for losses in the inverter. Signal $I_{loss}^*$ is produced by link voltage regulator 47. Link voltage regulator 47 receives as an input a reference signal $V_{DC}^*$ which represents the nominal voltage level across capacitor 16 as well as an output signal produced by sample and hold (S/H) device 48. S/H device 48 receives an input signal $V_{DC}$ representative of the measured voltage across capacitor 16 as well as signal $V_o^*$. Signal $V_{DC}$ is also fed to controllers 41 and 42 for the purpose of linearizing the PWM action. The output signal of S/H device 38 therefore represents a rippleless feedback signal even in the presence of voltage harmonics superimposed on the DC link voltage.

The output of summing junction 46 is then fed to summing junction 49, where it is subtracted from a measured value of the series inverter current $I_s$ (which has been multiplied at multiplier 50 by a factor N equal to the ratio of turns in secondary winding 24 of transformer 22 with respect to primary winding 23). The error signal thus produced is then fed to controller 41.

Controller 42 also receives an input representative of the measured value of voltage $V_o$. Additionally, a current demand signal is passed to controller 42 which is the sum of various currents supplied by parallel inverter 15. Specifically, a measured value of the output current $I_o$ through a bandpass filter (BPF) 51 to obtain the fundamental current. This fundamental current is then subtracted from the output current $I_o$ at summing junction 52 to obtain a ripple current signal $I_r$. Ripple current signal $I_r$ is then added to $I_{loss}*$ at summing junction 53. A signal representative of the measured value of the parallel inverter current $I_p$ is then subtracted from the output of summing junction 53 at summing junction 54. It is the output of summing junction 54 which is fed to controller 42.

Figure 4:
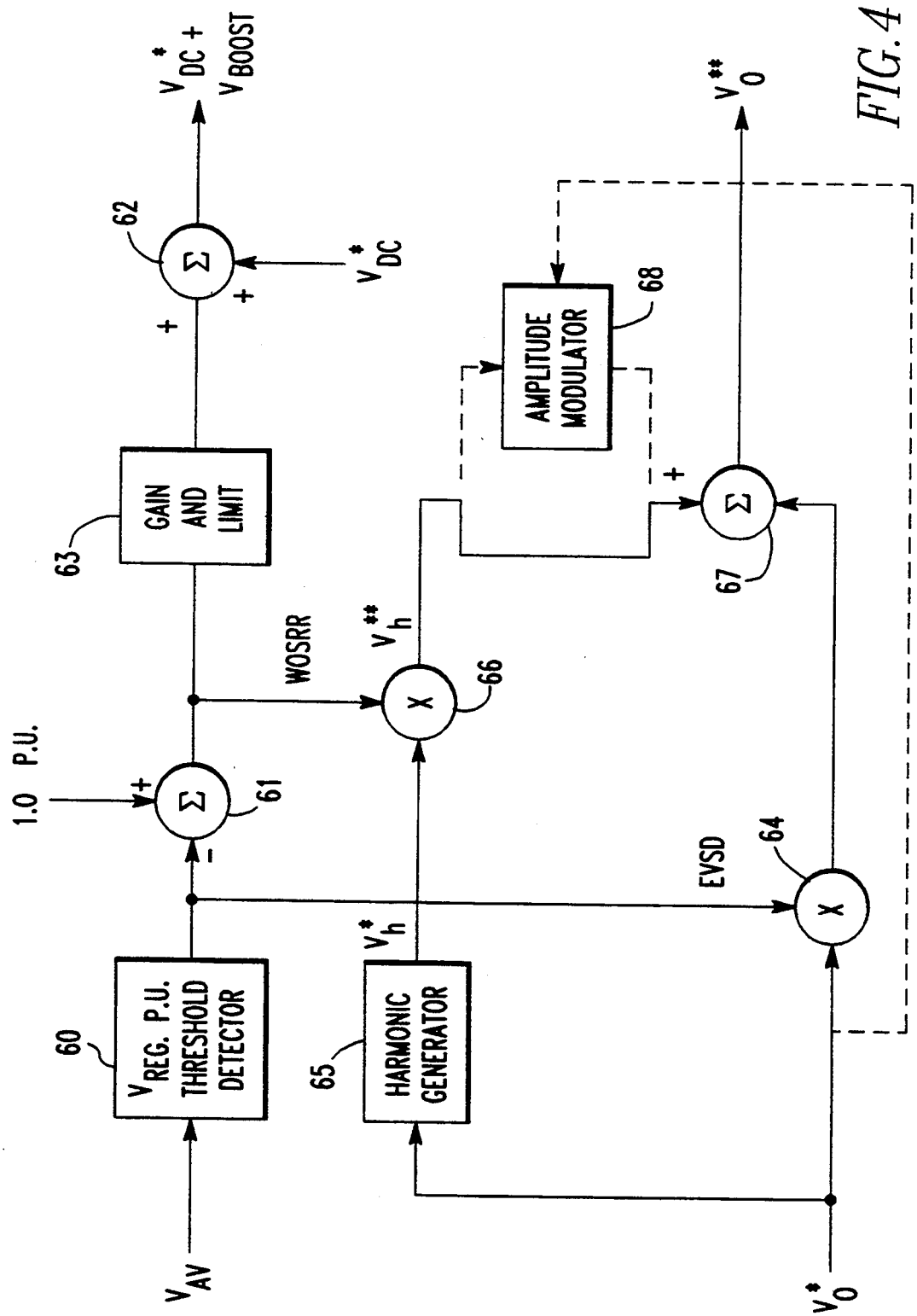
FIG. 4 is a diagrammatic representation of presently preferred means for superimposing selected harmonics onto the voltage reference signal utilized to effect boosting of the AC input voltage when the AC input voltage is not within the sinusoidal regulation range of the APLC of FIG. 1A.

FIG. 4 diagrammatically illustrates presently preferred means to realize harmonic injection circuitry 40. As shown, signal $V_{AV}$ is first fed to a $V_{REG}$ PU threshold detector 60. If the value of signal $V_{AV}$ is within the sinusoidal regulation range of APLC 10, then the output of detector 60 will be maintained at unity (1.0 PU) magnitude. If the value of $V_{AV}$ is not within the sinusoidal regulation range of APLC 10, the output of detector 60 will track $V_{AV}$ without an offset equal to the sinusoidal regulation range in per unit terms. The output signal of detector 60 may thus be thought of as an excessive voltage sag detection signal ("EVSD"). As an example, consider a situation in which APLC 10 has a 10% linear regulation range. In per unit terms, this translates into a value $V_{REG}$ equal to 0.1 PU. It the value of $V_{AV}$ sags 20%, signal EVSD becomes 0.8 plus 0.1, which equals 0.9 PU.

Signal EVSD is passed to the input of summing junction 61. There, it is subtracted from a 1.0 PU reference signal. It can thus be seen that, only when the value of signal $V_{AV}$ is not within the sinusoidal regulation range of APLC 10 will the output of summing junction 61 be greater than zero. Therefore, signal WOSRR ("without sinusoidal regulation range"), which is produced at the output of summing junction 61, will represent an amount by which $V_{in}$ is outside of this range.

As discussed above, the voltage across capacitor 16 is nominally maintained at a DC level approximately equal to the peak level of the nominal AC line voltage. As such, series inverter 14 can produce AC voltage on secondary winding 24 generally having a magnitude of 1.0 PU. If the winding ratio of transformer 22 is, for example, 1:10, a maximum voltage of 0.1 PU can be produced across primary winding 23. Therefore, in the case of a series-parallel device such as APLC 10, it is necessary to provide means of producing higher peak levels. It is important to note, however, that such measures are not required in the case of a series-inductor active power line conditioner, such as APLC 30.

One technique for producing higher peak levels in a series-parallel APLC involves replacing transformer 22 with a reduced-turns-ratio transformer having the same core configuration. This technique is disclosed and described in a copending application by the present inventor entitled "Series-Parallel Active Power Line Conditioner Utilizing Reduced-Turns-Ratio Transformer for Enhanced Peak Voltage Regulation Capability, U.S. Ser. No. 08/106,850, filed Aug. 16, 1993." Another technique for providing higher peak levels involves temporarily boosting the link voltage level in response excessive line voltage deviations. This technique is disclosed and described in a second copending application by the present inventor entitled "Series-Parallel Active Power Line Conditioner Utilizing Temporary Link Energy Boosting for Enhanced Peak Voltage Regulation Capability, U.S. Ser. No. 08/106,262, filed Aug. 18, 1993." Both of these applications are incorporated herein by reference.

For purposes of illustration herein, harmonic injection circuitry 40 will incorporate circuitry to achieve higher peak levels by link voltage boosting. Summing junction 62 receives a reference signal $V_{DC}*$ which represents the nominal voltage level across capacitor 16. If APLC 10 is operating in its sinusoidal regulation range, signal $V_{DC}*$ is passed faithfully to link voltage regulator 47. If, however, the line voltage is not within the sinusoidal range APLC 10, gain and limit circuitry 63 augments $V_{DC}*$ by an amount of voltage boost $V_{BOOST}$ by which the link voltage is to be increased. The magnitude of $V_{BOOST}$ is generally proportional to the magnitude of signal WOSRR.

Returning now to circuitry used to provide the harmonic injection, signal EVSD is multiplied at multiplier 64 by output voltage reference signal $V_o*$. At the same time, signal $V_o*$ is fed to a harmonic generator 65 which generates a constant amplitude harmonic signal $V_h*$ at the desired harmonic frequency. Signal $V_h*$ is then fed to multiplier 66 where it is multiplied by signal WOSRR to produce a harmonic reference signal $V_h$. Signal $V_h$ preferably has an amplitude related to the amount by which voltage $V_{in}$ is outside the sinusoidal regulation range of the active power line conditioner. Signal $V_h$ is then added to the output of multiplier 64 at summing junction 67 to produce signal $V_o$. In applications where it is desired to amplitude modulate the injected harmonics, signal $V_h**$ may be applied to amplitude modulator 68 before being fed to summing junction 67. Amplitude modulator 68 may produce the AM envelope at twice the fundamental frequency by full wave rectification of fundamental voltage reference signal $V_o*$.

Generation of the reference signal $V_o**$ is generally similar in the case of series-parallel APLC 30 to that described above. One important difference is that signals reference signals $V_o*$ and $V_h*$ are further processed by phase shifting in an amount given by the derived optimal voltage phase shift parameter, $\Phi*$. Additionally, higher order harmonics may be desirable so that series inductor 31 will provide better "isolation" to prevent the output voltage harmonics from reflecting back toward energy source 11.

It can thus be seen that the present invention provides an improved active power line conditioner which is capable of achieving greater peak voltage regulation than similarly-sized devices operative according to current teachings. While presently preferred embodiments of the invention have been described and illustrated, it is to be distinctly understood that the invention is not limited thereto but may be otherwise variously embodied and practiced within the scope of the following claims.

What is claimed is:

1. An improved active power line conditioner of the type for electrical connection interposing an electrical energy source and an electrical load to regulate AC output voltage supplied to said electrical load when AC input voltage remains within a preselected sinusoidal regulation range, said active power line conditioner including control means for controlling at least one inverter including a DC energy storage element, wherein the improvement comprises:

said control means further having harmonic means for regulating said AC output voltage to have at least one harmonic frequency component superimposed on a fundamental frequency component thereof when said AC input voltage is not within said sinusoidal regulation range of said active power line conditioner.

2. The active power line conditioner of claim 1 wherein said at least one harmonic frequency component is at least one odd harmonic frequency component selected from a group consisting of a third harmonic component and a fifth harmonic component.

3. The active power line conditioner of claim 2 wherein said harmonic means is operative to produce a harmonic reference signal when said variations of AC input voltage supplied by said electrical energy source are not within said sinusoidal regulation range of said active power line conditioner, said harmonic reference signal having an amplitude proportional to an amount by which said AC input voltage is not within said sinusoidal regulation range of said active power line conditioner.

4. The active power line conditioner of claim 3 wherein said harmonic means is further operative to modulate an amplitude of said harmonic reference signal at an envelope frequency twice a fundamental frequency of said AC input voltage.

5. The active power line conditioner of claim 1 wherein said harmonic means comprises:

means for determining an average value of said AC input voltage;

threshold means for determining whether said average value of said AC input voltage is not within said sinusoidal regulation range;

means for producing a harmonic reference having a selected harmonic frequency of a fundamental frequency of said AC input voltage;

means for superimposing said harmonic reference on a fundamental frequency reference when said AC input voltage is not within said sinusoidal regulation range of said active power line conditioner.

6. The active power line conditioner of claim 5 wherein said harmonic means further comprises:

means for scaling said fundamental frequency reference in inverse proportion to an amount by which said AC input voltage is not within said sinusoidal regulation range; and means for scaling said harmonic reference in proportion to said amount by which said AC input voltage is not within said sinusoidal regulation range.

7. The active power line conditioner of claim 6 wherein said harmonic means further comprises amplitude modulation means for varying said harmonic reference at a frequency twice a frequency of said fundamental frequency reference.

8. An active power line conditioner for electrical connection interposing an electrical energy source and an electrical load, said active power line conditioner comprising:

series inverter means for electrical coupling to said electrical energy source to selectively provide an AC regulation voltage in series with an AC input voltage supplied by said electrical energy source;

parallel inverter means for electrical coupling across said electrical load to selectively source and sink electrical current;

a DC energy storage element electrically connected between said series inverter means and said parallel inverter means;

control means for controlling said series inverter means and said parallel inverter means to regulate an AC output voltage across said electrical load during variations of said AC input voltage;

said control means operative to maintain DC energy in said electrical energy storage element at a nominal DC energy level when said variations of said AC input voltage are within a sinusoidal regulation range of said active power line conditioner; and said control means further having harmonic means for regulating said AC output voltage to have at lease one harmonic frequency component superimposed on a fundamental frequency component thereof when said AC input voltage is not within said sinusoidal regulation range of said active power line conditioner.

9. The active power line conditioner of claim 8 wherein said harmonic means comprises:

means for determining an average value of said AC input voltage;

threshold means for determining whether said average value of said AC input voltage is not within said sinusoidal regulation range;

means for producing a harmonic reference having a selected harmonic frequency of a fundamental frequency of said AC input voltage;

means for superimposing said harmonic reference on a fundamental frequency reference when said AC input voltage is not within a sinusoidal regulation range of said active power line conditioner.

10. The active Dower line conditioner of claim 9 wherein said harmonic means further comprises:

means for scaling said fundamental frequency reference in inverse proportion to an amount by which said AC input voltage is not within said sinusoidal regulation range; and means for scaling said harmonic reference in proportion to said amount by which said AC input voltage is not within said sinusoidal regulation range.

11. The active power line conditioner of claim 10 wherein said harmonic means further comprises amplitude modulation means for varying said harmonic reference at a frequency twice a frequency of said fundamental frequency reference.

12. The active power line conditioner of claim 8 wherein said harmonic means further comprises means for boosting an energy level in said DC energy storage element when said AC input voltage is not within said sinusoidal regulation range.

13. An active power line conditioner to selectively condition electrical energy supplied from an electrical energy source to an electrical load, said active power line conditioner comprising:

an inductive winding serially connectable between said electrical energy source and said electrical load;

a parallel inverter generally electrically connectable across said electrical load, said parallel inverter including a DC energy storage element;

control means for controlling said parallel inverter to effect the selected conditioning of electrical energy delivered from the electrical energy source to the electrical load; and said control means further having harmonic means for regulating said AC output voltage to have at least one harmonic frequency component superimposed on a fundamental frequency component thereof when said AC input voltage is not within a sinusoidal regulation range of said active power line conditioner.

14. The active power line conditioner of claim 13 wherein said harmonic means comprises:
    means for determining an average value of said AC input voltage;
    threshold means for determining whether said average value of said AC input voltage is not within said sinusoidal regulation range;
    means for producing a harmonic reference having a selected harmonic frequency of a fundamental frequency of said AC input voltage;
    means for superimposing said harmonic reference on a fundamental frequency reference when said AC input voltage is not within said sinusoidal regulation range of said active power line conditioner.

15. The active power line conditioner of claim 14 wherein said harmonic means further comprises:
    means for scaling said fundamental frequency reference in inverse proportion to an amount by which said AC input voltage is not within said sinusoidal regulation range; and
    means for scaling said harmonic reference in proportion to said amount by which said AC input voltage is not within said sinusoidal regulation range of said active power line conditioner.

16. The active power line conditioner of claim 15 wherein said harmonic means further comprises amplitude modulation means for varying said harmonic reference at a frequency twice a frequency of said fundamental frequency reference.

* * * * *